US012674659B2

(12) United States Patent
Tooyama

(10) Patent No.: US 12,674,659 B2
(45) Date of Patent: Jul. 7, 2026

(54) THREE-DIMENSIONAL MEASUREMENT SYSTEM

(71) Applicant: FANUC CORPORATION, Yamanashi (JP)

(72) Inventor: Wataru Tooyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 244 days.

(21) Appl. No.: 18/260,614

(22) PCT Filed: Mar. 18, 2022

(86) PCT No.: PCT/JP2022/012570
§ 371 (c)(1),
(2) Date: Jul. 6, 2023

(87) PCT Pub. No.: WO2022/202655
PCT Pub. Date: Sep. 29, 2022

(65) Prior Publication Data
US 2024/0060771 A1 Feb. 22, 2024

(30) Foreign Application Priority Data
Mar. 24, 2021 (JP) ................................. 2021-049676

(51) Int. Cl.
*G01B 11/24* (2006.01)
*G01B 11/22* (2006.01)

(52) U.S. Cl.
CPC .............. *G01B 11/24* (2013.01); *G01B 11/22* (2013.01)

(58) Field of Classification Search
CPC .................................. G01B 11/24; G01B 11/22
See application file for complete search history.

(56) References Cited

U.S. PATENT DOCUMENTS

| | | | |
|---|---|---|---|
| 2008/0091360 A1* | 4/2008 | Migda | G01N 21/57 |
| | | | 250/221 |
| 2013/0211766 A1* | 8/2013 | Rosenberg | G01S 15/06 |
| | | | 702/97 |

(Continued)

FOREIGN PATENT DOCUMENTS

| | | |
|---|---|---|
| JP | 2012-202732 A | 10/2012 |
| JP | 2015-138489 A | 7/2015 |

(Continued)

OTHER PUBLICATIONS

International Search Report issued in PCT/JP2022/012570; mailed May 31, 2022.

*Primary Examiner* — Michelle M Iacoletti
*Assistant Examiner* — Jarreas C Underwood
(74) *Attorney, Agent, or Firm* — Studebaker Brackett PLLC

(57) ABSTRACT

The three-dimensional measurement system 1 pertaining to a first embodiment of the present disclosure, whereby the three-dimensional shape of a measurement object can be accurately measured regardless of the position of the measurement object, comprises a three-dimensional measurement unit 32 that measures the position and shape of the measurement object using a three-dimensional sensor 20 that measures a distance to the measurement object, a robot 10 that moves the three-dimensional sensor 20 or the measurement object, a distance measurement unit 33 that measures the distance between the three-dimensional sensor 20 and the measurement object, and a measurement orientation setting unit 34 that sets a measurement orientation of the robot 10 such that the distance between the three-dimensional sensor 20 and the measurement object is a prescribed reference distance on the basis of the distance between the (Continued)

three-dimensional sensor 20 and the measurement object, measured by the distance measurement unit 33.

3 Claims, 4 Drawing Sheets

(56)                    References Cited

U.S. PATENT DOCUMENTS

| | | | | |
|---|---|---|---|---|
| 2017/0358048 | A1* | 12/2017 | Kotake | G06T 1/0007 |
| 2020/0286291 | A1* | 9/2020 | Ebert | G06T 7/593 |
| 2022/0241032 | A1* | 8/2022 | Zucker | A61B 90/37 |
| 2022/0395978 | A1* | 12/2022 | Sherrod | B25J 9/1653 |

FOREIGN PATENT DOCUMENTS

| | | | |
|---|---|---|---|
| JP | 2019-089168 | A | 6/2019 |
| JP | 2019-184340 | A | 10/2019 |
| JP | 2020-091126 | A | 6/2020 |

* cited by examiner

FIG. 1

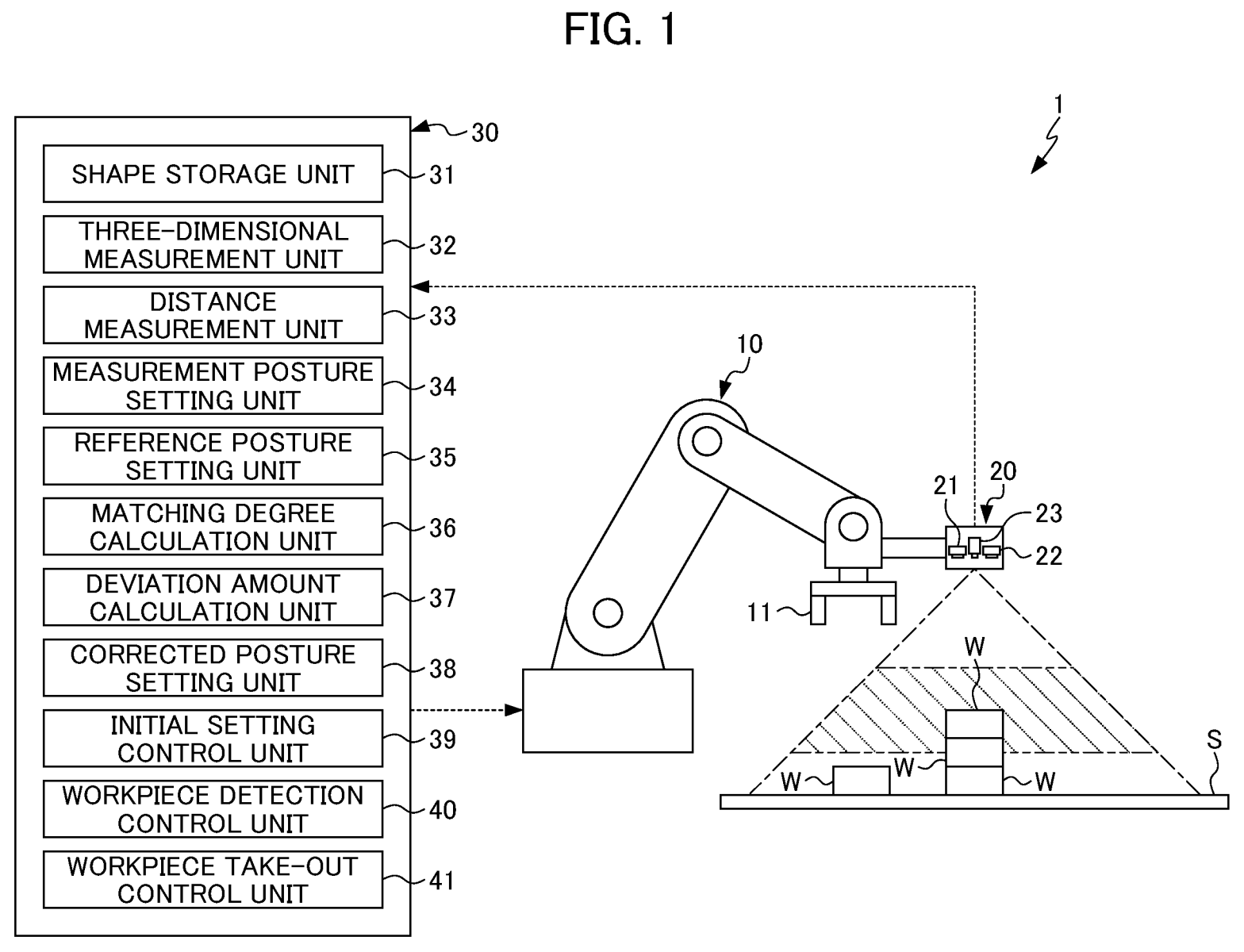

SHAPE STORAGE UNIT

THREE-DIMENSIONAL MEASUREMENT UNIT

DISTANCE MEASUREMENT UNIT

MEASUREMENT POSTURE SETTING UNIT

REFERENCE POSTURE SETTING UNIT

MATCHING DEGREE CALCULATION UNIT

DEVIATION AMOUNT CALCULATION UNIT

CORRECTED POSTURE SETTING UNIT

INITIAL SETTING CONTROL UNIT

WORKPIECE DETECTION CONTROL UNIT

WORKPIECE TAKE-OUT CONTROL UNIT

FIG. 2

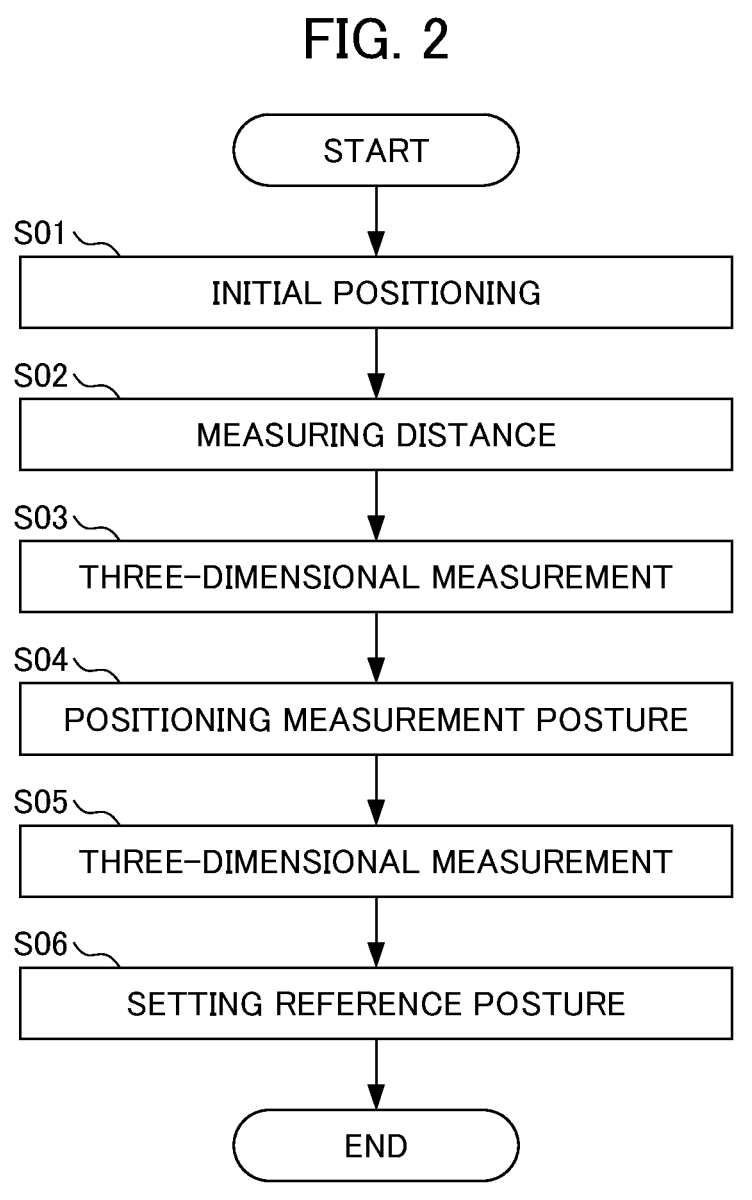

START

S01
INITIAL POSITIONING

S02
MEASURING DISTANCE

S03
THREE-DIMENSIONAL MEASUREMENT

S04
POSITIONING MEASUREMENT POSTURE

S05
THREE-DIMENSIONAL MEASUREMENT

S06
SETTING REFERENCE POSTURE

END

Figure 4:
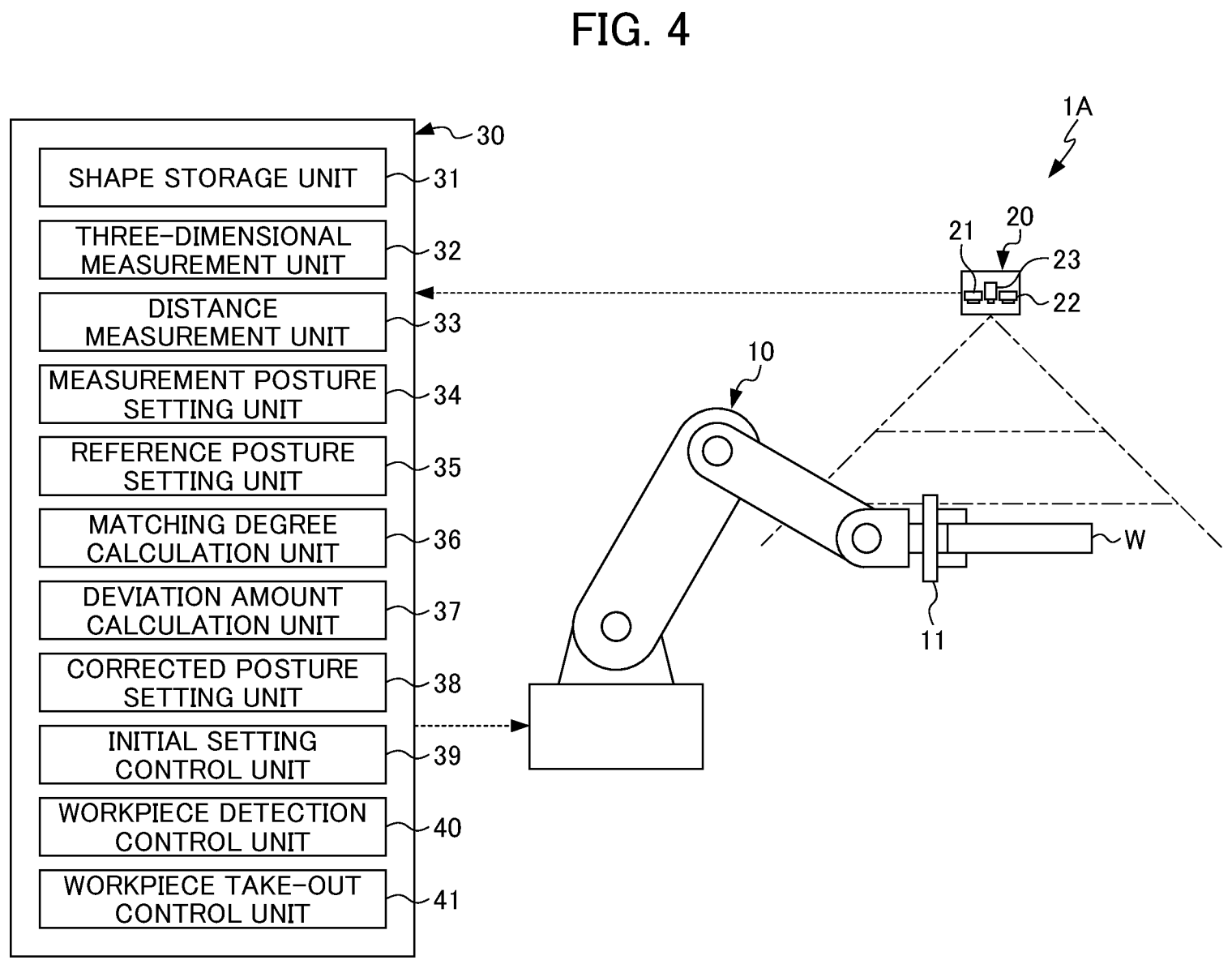

31 SHAPE STORAGE UNIT

32 THREE-DIMENSIONAL MEASUREMENT UNIT

33 DISTANCE MEASUREMENT UNIT

34 MEASUREMENT POSTURE SETTING UNIT

35 REFERENCE POSTURE SETTING UNIT

36 MATCHING DEGREE CALCULATION UNIT

37 DEVIATION AMOUNT CALCULATION UNIT

38 CORRECTED POSTURE SETTING UNIT

39 INITIAL SETTING CONTROL UNIT

40 WORKPIECE DETECTION CONTROL UNIT

41 WORKPIECE TAKE-OUT CONTROL UNIT

THREE-DIMENSIONAL MEASUREMENT SYSTEM

TECHNICAL FIELD

The present invention relates to a three-dimensional measurement system.

BACKGROUND ART

For example, there is a system in which a robot picks up workpieces that are arranged at random positions and in random orientations. For this system, in order to grasp the position and orientation of each workpiece, a three-dimensional measurement system may be used which measures a three-dimensional shape of a measurement target by using a three-dimensional sensor for detecting a distance to the measurement target and a distance to objects around the measurement target for each position in two-dimensional vision.

For the purpose of more accurately grasping the three-dimensional shape of the measurement target, it has been also proposed to measure the three-dimensional shape of the measurement target in different directions by the three-dimensional sensor such that the shape of a rear side of the measurement target, which cannot be checked by single three-dimensional measurement, is complemented based on the results of additional three-dimensional measurement (for see, example, Patent Document 1).

Patent Document 1: Japanese Unexamined Patent Application, Publication No. 2019-184340

DISCLOSURE OF THE INVENTION

Problems to be Solved by the Invention

Some three-dimensional sensors are capable of performing accurate detection within a relatively narrow distance range. In this case, if the distance between the three-dimensional sensor and a measurement target is not appropriate, the three-dimensional shape of the measurement target cannot be accurately measured. For example, in a case where a plurality of workpieces randomly overlap with each other, it may be impossible for the uppermost and lowermost workpieces to be within the appropriate distance range of the three-dimensional sensor at the same time. Therefore, there is a demand for a three-dimensional measurement system capable of accurately measuring a three-dimensional shape of a measurement target regardless of the position of the measurement target.

Means for Solving the Problems

A first aspect of the present disclosure is directed to a three-dimensional measurement system including: a three-dimensional measurement unit configured to measure a position and a shape of a measurement target using a three-dimensional sensor for measuring a distance to the measurement target; a robot configured to move the three-dimensional sensor or the measurement target; a distance measurement unit configured to measure a distance between the three-dimensional sensor and the measurement target; and a measurement posture setting unit configured to set, for the robot, a measurement posture in which a distance between the three-dimensional sensor and the measurement target is set to be equal to a predetermined reference distance, based on the distance between the three-dimensional sensor and the measurement target measured by the distance measurement unit.

A second aspect of the present disclosure is directed to a three-dimensional measurement system including: a three-dimensional measurement unit configured to measure a position and a shape of a measurement target using a three-dimensional sensor for measuring a distance to the measurement target; a robot configured to move the three-dimensional sensor or the measurement target; a reference posture setting unit configured to set a reference posture for the robot; a shape storage unit configured to store therein the shape of the measurement target in advance; a matching degree calculation unit configured to calculate a matching degree between the shape of the measurement target measured by the three-dimensional measurement unit and the shape of the measurement target stored in the shape storage unit; a deviation amount calculation unit configured to calculate a deviation amount by which a distance between the three-dimensional sensor and the measurement target deviates from a reference distance, based on the position and the shape of the measurement target measured by the three-dimensional measurement unit; and a corrected posture setting unit configured to set, for the robot, a corrected posture in which the three-dimensional sensor is moved by the deviation amount in a case where the matching degree is less than a predetermined criterial threshold value.

Effects of the Invention

The three-dimensional measurement system according to the present disclosure is capable of accurately measuring a three-dimensional shape of a measurement target regardless of the position of the measurement target.

BRIEF DESCRIPTION OF THE DRAWINGS

FIG. 1 is a schematic diagram illustrating a configuration of a three-dimensional measurement system according to a first embodiment of the present invention;

FIG. 2 is a flowchart illustrating a procedure of an initial setting process that is performed by the three-dimensional measurement system of FIG. 1;

FIG. 4 is a schematic diagram illustrating a configuration of a three-dimensional measurement system according to a second embodiment of the present invention.

PREFERRED MODE FOR CARRYING OUT THE INVENTION

Figure 3:
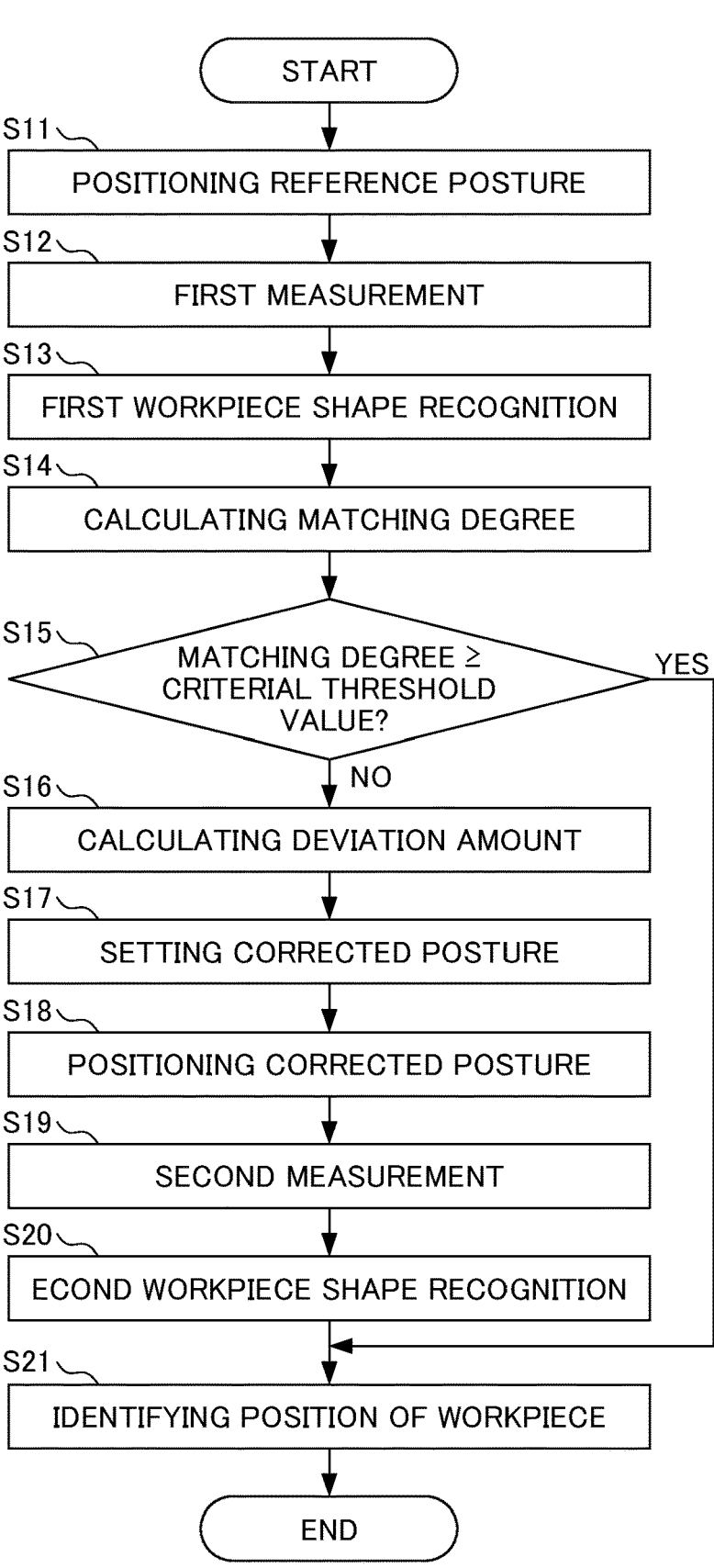
FIG. 3 is a flowchart illustrating a procedure of a workpiece detection process that is performed by the three-dimensional measurement system of FIG. 1.

Embodiments of a three-dimensional measurement system according to the present disclosure will be described below with reference to the drawings. FIG. 1 is a schematic diagram illustrating a configuration of a three-dimensional measurement system 1 according to a first embodiment of the present disclosure.

The three-dimensional measurement system 1 includes a robot 10, a three-dimensional sensor 20, and a controller 30. The three-dimensional measurement system 1 is adapted for measuring the position and shape of a measurement target such as workpieces W illustrated as an example, and is configured to be usable as a pickup system for picking up workpieces W one by one.

In the three-dimensional measurement system 1, the workpieces W are placed on a reference surface S, examples of which include a surface of a table, a belt surface of a belt conveyor, and a bottom surface of a container. The workpieces W may be arranged on the reference surface S so as to overlap with each other.

In order for the three-dimensional measurement system 1 to be used as a pickup system, the robot 10 has, at a distal end thereof, a hand 11 that holds the workpiece W. The robot 10 positions the three-dimensional sensor 20 at a position where the workpiece W (the workpiece W before being held by the hand 11) can be measured. The robot 10 may be a vertical articulated robot as illustrated in FIG. 1, but is not limited thereto. The robot 10 may be, for example, an orthogonal coordinate robot, a scalar robot, or a parallel link robot.

The hand 11 may have any configuration as long as it can hold the workpiece W, and may have a plurality of finger-shaped members for gripping the workpiece W, a vacuum pad for holding the workpiece W by suction, and the like.

The three-dimensional sensor 20 measures a distance to a measurement target and distances to other objects. More specifically, the three-dimensional sensor 20 detects the distance to the measurement target and the distances to other objects for each two-dimensional position in the field of view of the three-dimensional sensor 20, that is, for each position in a plane direction perpendicular to the central axis of a measurement range. In other words, the three-dimensional sensor 20 acquires information that enables distance images of the measurement target and three-dimensional images of point group data of the measurement target to be generated. The measurement target is not limited to the workpieces W, but may be, for example, an initial setting jig for implementing initial setting to set conditions that allow the three-dimensional measurement system 1 to perform accurate measurement.

The three-dimensional sensor 20 ensures measurement of a distance to the measurement target with a predetermined accuracy only in a predetermined distance range marked with hatching in the figure. Outside this distance range, there is a possibility for the three-dimensional sensor 20 to cause a large measurement error or to be prevented from obtaining a measurement value.

The three-dimensional sensor 20 may include two two-dimensional cameras 21 and 22 that capture two-dimensional images of the measurement target, and a projector 23 that projects an image including a grid-shaped reference point onto the measurement target. The three-dimensional sensor 20 having this configuration causes the two two-dimensional cameras 21 and 22 to capture images of the measurement target on which the grid-shaped reference point is projected, and enables calculation of a distance from the three-dimensional sensor 20 to each grid based on a positional deviation between the grids that is caused by parallax of the images captured by the two two-dimensional cameras 21 and 22.

The controller 30 includes a shape storage unit 31, a three-dimensional measurement unit 32, a distance measurement unit 33, a measurement posture setting unit 34, a reference posture setting unit 35, a matching degree calculation unit 36, a deviation amount calculation unit 37, a corrected posture setting unit 38, an initial setting control unit 39, a workpiece detection control unit 40, and a workpiece take-out control unit 41. The controller 30 may be implemented by causing one or more computer devices having a memory, a CPU, an input/output interface, etc. to execute appropriate programs. The components constituting the controller 30 are functionally distinguishable from each other, and do not have to be clearly distinguishable from each other in terms of physical configuration and program configuration.

The shape storage unit 31 stores therein the shapes of measurement targets (e.g., the workpiece W, the initial setting jig (not shown), etc.) in advance. The three-dimensional measurement system 1 recognizes an object having a shape matching the shape stored in the shape storage unit 31 as the measurement target.

The three-dimensional measurement unit 32 uses the three-dimensional sensor 20 and measures the position and shape of the measurement target and those of objects around the measurement target. Specifically, the three-dimensional measurement unit 32 provides the three-dimensional sensor 20 with a trigger for detection, and generates three-dimensional data of a surface shape of an object such as the measurement target in a coordinate system of the three-dimensional sensor 20, based on the detection data from the three-dimensional sensor 20.

The distance measurement unit 33 measures a distance (hereinafter referred to as an initial arrangement distance) between the three-dimensional sensor 20 and the measurement target. Although the distance measurement unit 33 may be configured to use a dedicated sensor, the distance measurement unit 33 may be configured to measure the initial arrangement distance between the three-dimensional sensor 20 and the measurement target using one of the two two-dimensional cameras 21 and 22 of the three-dimensional sensor 20. For example, the distance measurement unit 33 may be configured to calculate the initial arrangement distance between the three-dimensional sensor 20 and the measurement target based on a plurality of two-dimensional images of the measurement target captured by the two-dimensional cameras 21 and 22 from different positions along with changes in the posture of the robot 10.

The measurement posture setting unit 34 sets, for the robot 10, a measurement posture in which a predicted value of the distance between the three-dimensional sensor 20 and the measurement target is set to be equal to a predetermined reference distance, based on the initial arrangement distance between the three-dimensional sensor 20 and the measurement target measured by the distance measurement unit 33. The reference distance refers to a distance at which the three-dimensional sensor 20 can perform distance detection with accuracy. In other words, the "measurement posture" is a posture in which the robot 10 positions the three-dimensional sensor 20 at a position that enables the three-dimensional measurement unit 32 to perform accurate measurement. It should be noted that since the "measurement posture" is determined based on one measurement value of the initial arrangement distance that may include an error, and that the actual distance between the three-dimensional sensor 20 and the measurement target is not always exactly identical with the reference distance when the robot is in the "measurement posture".

The reference posture setting unit 35 sets, for the robot 10, a reference posture in which a distance (hereinafter referred to as the measurement arrangement distance) between the three-dimensional sensor 20 and the measurement target that is calculated based on the position and shape of the measurement target measured by the three-dimensional measurement unit 32 in a state in which the robot 10 is in the measurement posture is set to be identical with the reference distance. In other words, the "reference posture" is a posture which is set based on the measurement arrangement distance between the three-dimensional sensor 20 and the measurement target that is measured relatively accurately by the three-dimensional measurement unit 32 in a state in which the robot is in the measurement posture, and in which the actual distance between the three-dimensional sensor 20 and the measurement target is considered to be more exactly identical with the reference distance.

The matching degree calculation unit 36 calculates a matching degree between the shape of the measurement target measured by the three-dimensional measurement unit 32 and the shape of the measurement target stored in the shape storage unit 31. In a case where the shape of the measurement target remains unchanged, as a deviation of the actual distance between the three-dimensional sensor 20 and the measurement target from the reference distance increases, the "matching degree" decreases due to a measurement error caused by the three-dimensional measurement unit 32.

The deviation amount calculation unit 37 calculates a deviation amount by which the measurement arrangement distance between the three-dimensional sensor 20 and the measurement target deviates from the reference distance, i.e., a difference between the measurement arrangement distance and the reference distance, based on the position and shape of the measurement target measured by the three-dimensional measurement unit 32. Since the measurement target is placed over the reference surface, the measurement arrangement distance becomes shorter than the reference distance when the measurement target overlaps with another object. For this reason, it is easy to define, as the deviation amount, a value obtained by subtracting the measurement arrangement distance from the reference distance.

When the matching degree calculated by the matching degree calculation unit 36 is less than a predetermined criterial threshold value, the corrected posture setting unit 38 sets, for the robot, a corrected posture in which the three-dimensional sensor 20 is moved by the deviation amount calculated by the deviation amount calculation unit. For example, the matching degree may significantly decrease when the measurement target is placed on top of another object after the reference posture setting unit 35 has set the reference posture and the actual distance to the measurement target has shortened. Therefore, when the matching degree is less than the criterial threshold value, the corrected posture is set in which the three-dimensional sensor 20 is moved by the deviation amount. In other words, by bringing about a state in which the actual distance between the three-dimensional sensor 20 and the measurement target is approximate to the reference distance, the corrected posture setting unit 38 sets the corrected posture that enables the three-dimensional sensor 20 to more accurately measure the position and shape of the measurement target.

The initial setting control unit 39 executes an initial setting process for setting, for the robot 10, the reference posture which is a posture serving as initial setting in a case where the three-dimensional measurement system 1 is to detect the position and orientation of the workpiece W, by causing the three-dimensional measurement unit 32, the distance measurement unit 33, the measurement posture setting unit 34, and the reference posture setting unit 35 to function in an appropriate order.

FIG. 2 illustrates a procedure of the initial setting process that is performed by the initial setting control unit 39. The initial setting process includes an initial positioning step (Step S01), a distance measurement step (Step S02), a measurement posture setting step (Step S03), a measurement posture positioning step (Step S04), a three-dimensional measurement step (Step S05), and a reference posture setting process (Step S06). The initial setting process may be performed using the workpiece W. However, it is preferable to use an initial setting jig (not shown) having a shape and a color that can be accurately detected by the three-dimensional measurement unit 32 and the distance measurement unit 33 and to perform the initial setting process using the initial setting jig placed on the reference surface S. As the initial setting jig, a jig is preferably used which has a shape characteristic at substantially the same height as that in a state in which one workpiece W is placed on the reference surface S without overlapping with other workpieces. Preferably, the initial setting jig has a feature point that is detectable by the three-dimensional measurement unit 32 and the distance measurement unit 33 and that is arranged rotationally asymmetrically.

In the initial positioning step denoted by Step S01, the robot 10 is caused to adopt a posture in which the distance measurement unit 33 can measure a distance to a measurement target. For example, this posture may be preset to a posture in which the robot 10 sufficiently separates the three-dimensional sensor 20 from the reference surface S, or may be set manually by an operator or an administrator. In other words, the initial positioning step may include requesting the operator or the administrator to position the robot 10 and receiving an input of confirming the completion of positioning.

In the distance measurement step denoted by Step S02, the distance measurement unit 33 is caused to measure the initial arrangement distance between the three-dimensional sensor 20 and the measurement target. Specifically, the distance measurement step may include, for example, a step of causing the two-dimensional camera 21 to capture an image of the measurement target, a step of changing the posture of the robot 10 so as to move the three-dimensional sensor 20, a step of causing the two-dimensional camera 21 to capture another image of the measurement target, and a step of calculating the initial arrangement distance between the three-dimensional sensor 20 and the measurement target from differences in position, shape, etc. of the measurement target between the two captured images.

In the measurement posture setting step denoted by Step S03, the measurement posture setting unit 34 sets, for the robot 10, the measurement posture in which the distance between the three-dimensional sensor 20 and the measurement target is set to be equal to the predetermined reference distance, based on the initial arrangement distance measured in the distance measurement step.

In the measurement posture positioning step denoted by Step S04, the robot 10 is caused to change its posture so as to adopt the assumed posture that has been set in the measurement posture setting step.

In the three-dimensional measurement step denoted by Step S05, the three-dimensional measurement unit 32 is caused to measure the position and shape of the measurement target using the three-dimensional sensor 20, thereby calculating the measurement arrangement distance between the three-dimensional sensor 20 and the measurement target.

In the reference posture setting step denoted by Step S06, the reference posture setting unit 35 sets, for the robot 10, the reference posture in which the distance between the three-dimensional sensor 20 and the measurement target is set to be equal to the predetermined reference distance, based on the measurement arrangement distance measured in the three-dimensional measurement step.

The workpiece detection control unit 40 performs a workpiece detection process for detecting the position and orientation of the workpiece W by causing the three-dimensional measurement unit 32, the matching degree calculation unit 36, the deviation amount calculation unit 37, and the corrected posture setting unit 38 to function in an appropriate order.

FIG. 3 illustrates a procedure of the workpiece detection process that is performed by the workpiece detection control unit 40. The workpiece detection process includes a reference posture positioning step (Step S11), a first measurement step (Step S12), a first workpiece shape recognition step (Step S13), a matching degree calculation step (Step S14), a matching degree checking step (Step S15), a deviation amount calculation step (Step S16), a corrected posture setting step (Step S17), a corrected posture positioning step (Step S18), a second measurement step (Step S19), a second workpiece shape recognition step (Step S20), and a workpiece position identification step (Step S21).

In the reference posture positioning step denoted by Step S11, the robot 10 is caused to move to adopt the reference posture that is set in advance in the initial setting process.

In the first measurement step denoted by Step S12, the three-dimensional measurement unit 32 uses three-dimensional sensor 20 to measure the position and shape of the measurement target and those of objects around the measurement target. In a case where the workpiece W is in the same condition as the measurement target used in the initial setting process, typically, in a case where the workpiece W is placed on the reference surface S without overlapping with other objects, the shape measured in the first measurement step includes a portion relatively accurately matching the shape of the workpiece W.

In the first workpiece shape recognition step denoted by Step S13, a well-known pattern recognition technique is used to thereby identify a portion having a shape similar to the shape of the workpiece W stored in the shape storage unit 31 from the shape measured in the first measurement step.

In the matching degree calculation step denoted by Step S14, the matching degree calculation unit 36 is caused to calculate a matching degree that indicates how much the portion identified in the first workpiece shape recognition step matches the shape of the workpiece W stored in the shape storage unit 31.

In the matching degree checking step denoted by Step S15, it is checked whether the matching degree calculated in the matching degree calculation step is not less than a predetermined criterial threshold value. When the matching degree is not less than the predetermined criterial threshold value, the process proceeds to Step S21, and when the matching degree is less than the predetermined criterial threshold value, the process proceeds to Step S16. For example, in a conceivable case where the matching degree is low, workpieces W are placed one on top the other and the uppermost workpiece W is outside the optimal distance range of the three-dimensional sensor 20.

In the deviation amount calculation step denoted by Step S16, the deviation amount calculation unit 37 is caused to calculate a deviation amount by which the distance between the three-dimensional sensor 20 and the measurement target (the portion with the shape based on which the matching degree has been calculated in the matching degree calculation step) deviates from the reference distance, based on the position and shape of the measurement target measured in the first measurement step.

In the corrected posture setting step denoted by Step S17, the corrected posture setting unit 38 sets, for the robot, the corrected posture in which the three-dimensional sensor 20 is retracted by the deviation amount calculated in the deviation amount calculation step, with respect to the reference posture.

In the corrected posture positioning step denoted by Step S18, the robot 10 is caused to move to adopt the corrected posture set in the corrected posture setting step. In this way, the distance to the workpiece W that has been identified by the three-dimensional sensor 20 in the first workpiece shape recognition step is made approximate to the reference distance, at which appropriate measurement can be performed.

In the second measurement step denoted by Step S19, the three-dimensional measurement unit 32 is caused to measure the position and shape of the measurement target and those of objects around the measurement target again. That is, in the second measurement step, the position and shape of the measurement target are measured again in a state in which the robot is in the corrected posture.

In the second workpiece shape recognition step denoted by Step S20, similarly to the first workpiece shape recognition step, a portion having a shape similar to the shape of the workpiece W stored in the shape storage unit 31 is identified from the shape measured in the second measurement step.

In the workpiece position identification step denoted by Step S21, the position and orientation of the workpiece W are identified on an assumption that the workpiece W is present at the position and orientation that match the portion having the shape identified in the first workpiece shape recognition step in the case where the matching degree has been determined to be not less than the criterial threshold value in the matching degree checking step, or on an assumption that the workpiece W is present at the position and orientation that match the portion having the shape identified in the second workpiece shape recognition step in the case where the matching degree has been determined to be less than the criterial threshold value in the matching degree checking step.

The workpiece take-out control unit 41 performs a workpiece take-out process by a conventional method such that the robot 10 is moved and caused to grip and take out, with the hand 11, the workpiece W identified by way of the workpiece detection process performed by the workpiece detection control unit 40.

In a case where a plurality of workpieces W are placed on the reference surface S, the three-dimensional measurement system 1 can take out the workpieces W one by one by alternately repeating the workpiece detection process and the workpiece take-out process.

As described above, the three-dimensional measurement system 1 is capable of accurately measuring the three-dimensional shape of a measurement target regardless of the position of the measurement target. Therefore, the three-dimensional measurement system 1 is capable of reliably taking out the workpiece W.

FIG. 4 illustrates a configuration of a three-dimensional measurement system 1A according to a second embodiment of the present disclosure. In the three-dimensional measurement system 1A of FIG. 4, components similar to those of the three-dimensional measurement system 1 of FIG. 1 are denoted by the same reference numerals, and redundant description thereof are omitted.

The three-dimensional measurement system 1A includes a robot 10 having a hand 11, a three-dimensional sensor 20, and a controller 30. In the three-dimensional measurement system 1A, the three-dimensional sensor 20 is disposed above the robot 10 and is fixed to, for example, a ceiling, a beam, or the like of a room in which the three-dimensional measurement system 1A is installed.

The three-dimensional measurement system 1A measures the position and shape of a workpiece W in a state in which the hand 11 has the workpiece W gripped therein, thereby checking a deviation of a grip position at which the workpiece W is gripped by the hand 11. Accordingly, in the three-dimensional measurement system 1A, the robot 10 moves the measurement target held by the hand 11 with respect to the three-dimensional sensor 20.

Similarly to the three-dimensional measurement system 1 of FIG. 1, the controller 30 for the three-dimensional measurement system 1A of FIG. 4 includes a shape storage unit 31, a three-dimensional measurement unit 32, a distance measurement unit 33, a measurement posture setting unit 34, a reference posture setting unit 35, a matching degree calculation unit 36, a deviation amount calculation unit 37, a corrected posture setting unit 38, an initial setting control unit 39, a workpiece detection control unit 40, and a workpiece take-out control unit 41.

In an initial setting process and a workpiece detection process that are performed by the three-dimensional measurement system 1A of FIG. 4, the robot 10 enters the fields of view of two-dimensional cameras 21 and 22 while the three-dimensional measurement unit 32 and the distance measurement unit 33 is performing the respective measurement, but the procedure of the initial setting process and that of the workpiece detection process are the same as those of the three-dimensional measurement system 1 of FIG. 1.

The three-dimensional measurement system 1A of FIG. 4 is capable of accurately measuring the three-dimensional shape of a measurement target regardless of the grip position at which the measurement target is gripped by the hand 11. Therefore, the three-dimensional measurement system 1A can correct a deviation of the grip position at which the measurement target is gripped by the hand 11, and can cause the robot 10 to accurately position the workpiece W with respect to a machining device or the like.

While embodiments of the present invention have been described in the foregoing, the present invention is not limited to the embodiments described above. Furthermore, the effects described in the above embodiments are most preferred effects exerted by the present invention, and the effects of present invention are not limited to those described in the embodiments.

The three-dimensional measurement system according to the present invention may perform the workpiece detection process such that the position of the three-dimensional sensor and that of the measurement target measured by the distance measurement unit are checked in the same manner as in the initial setting process, may set, for the robot, a measurement posture in which the distance between the three-dimensional sensor and the measurement target is set to be equal to the reference distance, and may identify the position and orientation of the workpiece based on results of measurement of the position and shape of the measurement target that is performed by the three-dimensional measurement unit in a state in which the robot is in the measurement posture. In this case, in a second and subsequent initial positioning steps, it is preferable to automatically reproduce the posture for the robot set in the first initial positioning step.

In the three-dimensional measurement system according to the present invention, the reference posture may be set manually without performing the initial setting process, and then, the workpiece detection process may be performed.

Furthermore, in the three-dimensional measurement system according to the present invention, the corrected posture setting unit may determine the accuracy of the results of measurement performed by the three-dimensional measurement unit, based on, for example, the number of three-dimensional points that the three-dimensional measurement unit has successfully measured, the number of workpieces detected by the workpiece detection control unit, instead of or in addition to the matching degree, and may set a corrected posture when it is determined that the results of the measurement are inaccurate.

EXPLANATION OF REFERENCE NUMERALS

1: Three-dimensional measurement system
10: Robot
11: Hand
20: Three-dimensional sensor
21, 22: Two-dimensional camera
23: Projector
30: Controller
31: Shape storage unit
32: Three-dimensional measurement unit
33: Distance measurement unit
34: Measurement posture setting unit
35: Reference posture setting unit
36: Matching degree calculation unit
37: Deviation amount calculation unit
38: Corrected posture setting unit
39: Initial setting control unit
40: Workpiece detection control unit
41: Workpiece take-out control unit
S: Reference surface
W: Workpiece

The invention claimed is:

1. A three-dimensional measurement system comprising:

a three-dimensional measurement unit configured to measure a position and a shape of a measurement target using a three-dimensional sensor for detecting distances to the measurement target for each two-dimensional position in a field of view of the three-dimensional sensor;

a robot configured to move the three-dimensional sensor or the measurement target;

a distance measurement unit configured to measure a distance between the three-dimensional sensor and the measurement target; and a measurement posture setting unit configured to set, for the robot, one measurement posture in which a distance between the three-dimensional sensor and the measurement target is set to be equal to a predetermined reference distance, based on the distance between the three-dimensional sensor and the measurement target measured by the distance measurement unit, wherein the three-dimensional sensor includes a two-dimensional camera, the distance measurement unit calculates the distance between the three-dimensional sensor and the measurement target, based on a plurality of two-dimensional images of the measurement target captured by the two-dimensional camera from different positions along with changes in the posture of the robot, and the three-dimensional measurement unit generates three-dimensional data of a surface shape of the measurement target based on the distances to the measurement target detected at only the one measurement posture by the three-dimensional sensor.

2. The three-dimensional measurement system according to claim 1, further comprising:

a reference posture setting unit configured to set, for the robot, a reference posture in which a distance between the three-dimensional sensor and the measurement target is set to be identical with the reference distance, based on the position and the shape of the measurement target measured by the three-dimensional measurement unit in a state in which the robot is in the one measurement posture.

3. The three-dimensional measurement system according to claim 2, further comprising:

a shape storage unit configured to store therein the shape of the measurement target in advance;

a matching degree calculation unit configured to calculate a matching degree between the shape of the measurement target measured by the three-dimensional measurement unit and the shape of the measurement target stored in the shape storage unit;

a deviation amount calculation unit configured to calculate a deviation amount by which the distance between the three-dimensional sensor and the measurement target deviates from the reference distance, based on the position and the shape of the measurement target measured by the three-dimensional measurement unit; and a corrected posture setting unit configured to set, for the robot, a corrected posture in which the three-dimensional sensor is moved by the deviation amount in a case where the matching degree is less than a predetermined criterial threshold value.

\* \* \* \* \*